(12) United States Patent
Sharma et al.

(10) Patent No.: US 8,677,485 B2
(45) Date of Patent: Mar. 18, 2014

(54) DETECTING NETWORK ANOMALY

(75) Inventors: Puneet Sharma, Palo Alto, CA (US); Sriharsha Gangam, West Lafayette, IN (US); Sonia Fahmy, West Lafayette, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/548,638

(22) Filed: Jul. 13, 2012

(65) Prior Publication Data
US 2014/0020100 A1    Jan. 16, 2014

(51) Int. Cl.
*G06F 11/00*    (2006.01)
(52) U.S. Cl.
USPC ............................................. 726/22; 726/23
(58) Field of Classification Search
CPC .............. H04L 63/1416; H04L 63/145; H04L 63/1425; H04L 63/1433; H04L 63/1441; H04L 63/20; H04L 29/06877; H04L 29/06884; G06F 21/577
USPC .............................. 713/150–154; 726/22–26; 709/223–225, 228–229
See application file for complete search history.

(56) References Cited

U.S. PATENT DOCUMENTS

| 7,802,296 B2* | 9/2010 | Samprathi et al. | 726/13 |
| 8,474,041 B2* | 6/2013 | Eswaran et al. | 726/22 |
| 2005/0039086 A1* | 2/2005 | Krishnamurthy et al. | 714/57 |

OTHER PUBLICATIONS

Olston, et al., "Adaptive Filters for Continuous Queries over Distributed Data Streams," Proceedings of ACM SIGMOD International Conference on Management of Data, Jun. 9-12, 2003, 20 pages.
Arasu, et al., "Approximate Counts and Quantities over Sliding Windows," Proceedings of PODS 2004, Jun. 14-16, 2004, 11 pages.
Charikar, et al., "Finding Frequent Items in Data Streams," Theoretical Computer Science, vol. 312, Jan. 2004, 11 pages.
Cormode, et al., "An Improved Data Stream Summary: The count-min sketch and its applications," Journal of Algorithms, vol. 55, Issue 1, Feb. 2004, 11 pages.
Estan, et al., "New directions in traffic measurement and accounting," Proceedings of the 2002 Conference on Applications, Technologies, Architectures, and Protocols for Computer Communications, Oct. 2002, 62 pages.
Fagin, et al., "Optimal Aggregation Algorithms for Middleware," Journal of Computer and System Sciences 66, Jun. 2003, pp. 614-656.
Huang et al., Communication-Efficient Online Detection of Network-Wide Anomalies, INFOCOM 2007, 26th IEEE International Conference on Computer Communications, May 6-12, 2007, 9 pages.
Yu, et al., "Efficient Processing of Distributed Top-K Queries," In Proceedings of the 16th International Conference on Database and Expert Systems Applications, Aug. 22-26, 2005, 10 pages.
Karp., et al., "A Simple Algorithm for Finding Frequent Elements in Streams and Bags," ACM Transactions on Database Systems, vol. 28, Issue 1, Mar. 2003, pp. 51-55.
Unknown., "Cisco IOS Netflow," Retrieved from http://www.cisco.com/en/US/products/ps6601/products_ios_protocol_group_home.html, May 2012, 2 pages.

(Continued)

*Primary Examiner* — Hosuk Song (57) ABSTRACT

A method for detecting an anomaly in a network can include combining a number of data-created sketch-sets and requesting a finer sketch-set for an identified sketch-set among the combined number of sketch-sets using an aggregator, and creating the finer sketch-set for the identified sketch-set to detect the anomaly in the network using a monitor.

15 Claims, 4 Drawing Sheets

(56) References Cited

OTHER PUBLICATIONS

Unknown., "SFlow: Making the Network Visible," Retrieved from http://www.sflow.org/, May 2012, 1 page.
Duffield, et al., "Trajectory Sampling for Direct Traffic Observation," IEEE/ACM Transactions on Networking, vol. 9, No. 3, Jun. 2001, pp. 280-292.
Estan, et al., "Building a Better NetFlow," Proceedings of the 2004 Conference on Applications, Technologies, Architectures, and Protocols for Computer Communications, Aug. 30-Sep. 3, 2004, 12 pages.
Dhamdhere, et al., "FlowRoute: Inferring Forwarding Table Updates Using Passive Flow-level Measurements," Proceedings of the 10th Annual Conference on Internet Measurement, Nov. 1-3, 2010, pp. 315-321.
Lee, et al., "Secure Split Assignment Trajectory Sampling: A Malicious Router Detection System," In Proceedings of the International Conference on Dependable Systems and Networks, Jun. 25-28, 2006, 30 pages.
Mizrak et al., "Faith: Detecting and Isolating Malicious Routers," In Proceedings of the 2005 International Conference on Dependable Systems and Networks, DSN '05, Jun. 28-Jul. 1, 2005, 10 pages.
Zhang, et al., "Router Group Monitoring: Making Traffic Trajectory Error Detection More Efficient," IEEE Transactions on Network and Service Management, vol. 7, Issue 3, Sep. 2010, 14 pages.
Huang, et al., "Uncovering Global Icebergs in Distributed Streams: Results and Implications," J. Netw. Syst. Manage., Mar. 2011, 27 pages.
Li, et al., "MIND: A Distributed Multi-Dimensional Indexing System for Network Diagnosis," In Proceedings of the 25th IEEE International Conference on Computer Communications INFOCOM 2006, Apr. 23-29, 2006, 12 pages.
Keralapura, et al., "Communication-Efficient Distributed Monitoring of Thresholded Counts," In Proceedings of the 2006 ACM SIGMOD International Conference on Management of Data, Jun. 26-29, 2006, 12 pages.
Yuan, et al., "ProgME: Towards Programmable Network MEasurement," Proceedings of the ACM SIGCOMM 2007, Aug. 27-31, 2007, 12 pages.
Zhao, et al., "Global Iceberg Detection over Distributed Data Streams," In Proceedings of the 26th IEEE International Conference on Data Engineering (ICDE) 2010, Mar. 1-6, 2010, 12 pages.
Zhao, et al., "Finding Global Icebergs over Distributed Sets," Proceedings of the 25th ACM SIGMOD/PODS Symposium on Principles of Database Systems 2006, Jun. 26-29, 2006, 10 pages.
Babcock, et al., "Distributed Top-K Monitoring," Proceedings of the 2003 ACM SIGMOD International Conference on Management of Data, Jun. 9-12, 2003, 12 pages.
Cao, et al., "Efficient Top-K Query Calculation in Distributed Networks," Proceedings of the 23rd Annual ACM Symposium on Principles of Distributed Computing 2004, Jul. 25-28, 2004, 14 pages.

\* cited by examiner

DETECTING NETWORK ANOMALY

BACKGROUND

Sequences of packets can be sent from a source computer to a destination in a network. The flow of the packets sent, known as data flow, across a network can be monitored by the network and/or information technology (IT) personnel associated with the network.

DETAILED DESCRIPTION

Monitoring data flow across a network can be used to detect anomalies. An anomaly can include a data flow (e.g., a flow) in a network with a characteristic that may indicate the data flow may cause problems in the network (e.g., bandwidth consuming flow, worms, and/or attacks). Detecting an anomaly in a network can assist in detecting attacks, faults, and determining traffic properties across a network. Monitoring network data flow can include separate collection and analysis of monitored data using sampling and sketching techniques. For example, small samples can be taken by a number of agents and sent to an aggregator to be processed.

Monitoring data flow across a network can be challenging due to the emerging high bandwidth links in current networks. High bandwidth links can result in increasing traffic volume across a network. Thereby, monitoring data flow can require collecting large sets of detailed flow records. The monitored data of interest (e.g., anomaly) can include a small portion of the large set of detailed flow records collected. Transferring and processing the entire collected large set of detailed flow records can be unnecessary and inefficient as compared to the smaller portion including the data of interest.

Detecting an anomaly in a network, in accordance with various examples of the present disclosure, can include an adaptive and/or iterative approach to network monitoring to reduce the cost, as compared to the traditional approaches, while maintaining accuracy (e.g., limit the amount of false negatives and/or false positives). Detecting an anomaly in a network in accordance with some examples of the present disclosure can include a feedback mechanism performed by an aggregator to request for finer sketch-sets of data to detect an anomaly in a network.

Examples of the present disclosure include methods, system, and computer-readable medium storing a set of instructions to detect an anomaly in a network. A method for detecting an anomaly in a network can include combining a number of data-created sketch-sets and requesting a finer sketch-set for an identified sketch-set among the combined number of sketch-sets using an aggregator, and creating a finer sketch-set for the identified sketch-set to detect an anomaly in the network using a monitor.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit or digits correspond to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, "a number of" an element and/or feature can refer to one or more of such elements and/or features. Also, as used herein, the designators "N", "P", and "S", particularly with respect to reference numerals in the drawings, indicate that a number of a particular features so designated can be included.

Figure 1:
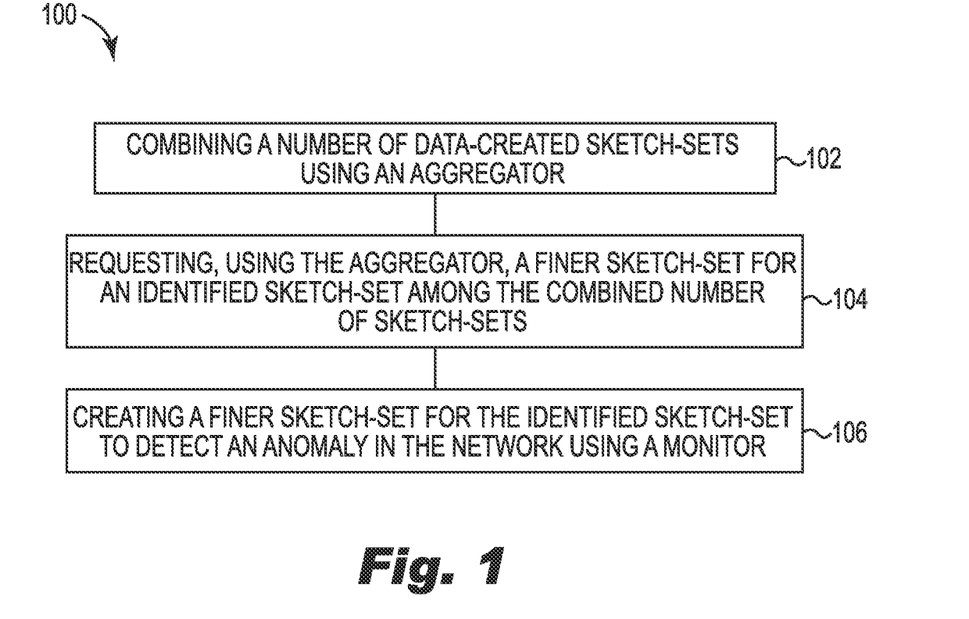
FIG. 1 is a block diagram illustrating an example of a method for detecting an anomaly in a network according to the present disclosure.

FIG. 1 is a block diagram illustrating an example of a method 100 for detecting an anomaly in a network according to the present disclosure. The method 100 can be used to detect a number of anomalies in a network without false positive and/or false negative anomaly detection.

In various examples of the present disclosure, a number of monitors can create a number of sketch-sets using collected data. A number of monitors, for instance, can include a number of co-located computers and storage at routers and/or switches in the network. The monitors, for example, can collect data, process data and/or analyze data, and store data locally. A sketch-set created can include a range of flows, such as a random range and/or a predetermined range. For instance, a sketch-set can be represented by a range of destination IP addresses of a number of flows and a minimum and maximum size of the number of flows in the sketch-set. The number of monitors can send a number of sketch-sets to an aggregator, for instance. An aggregator, for example, can include a computer and storage.

A sketch-set, for example, can include a property (e.g., flow size, port range, traffic volume, and router path) for an arbitrary collection of flows. For instance, a sketch-set may represent flows used in generating the sketch-set. A sketch-set may, in some examples of the present disclosure, additionally represent flows not used in the sketch-set. A sketch-set can support set operations (e.g., combining flows into sketch-sets, intersecting sketch-sets with common flows, and subtracting over-lapping sketch-set ranges from non-overlapping sketch-set ranges). The set operations, for instance, can allow for a sketch-set to be manipulated to represent an arbitrary collection of flows. Defining a sketch-set, for example, can include a number of parameters (e.g., flow size, port range, traffic size, and router path of a flow) that characterizes the sketch-set (e.g., a coarseness of a sketch-set). For example, a defined sketch-set can consume less memory than the memory consumed if each of the number of flows represented by the sketch-set is represented individually.

A flow can include a sequence of packets sent from a node (e.g., device and computer) to a destination (e.g., host, multicast group, and broadcast domain) and/or a set of packets passing an observation point (e.g., a number of agents) in a network during a certain time interval. A flow can be represented by a destination Internet Protocol (IP) address (e.g., network identifier) and a size of the flow (e.g., packet count).

At 102, a number of data-created sketch-sets can be combined using an aggregator. The aggregator, for example, can be used to process data sent (e.g., all data) to detect anomalies in a network. The data, for example, can include flow data (e.g., raw flow data). For instance, the data can be collected by a number of agents in a system to create the number of data-created sketch-sets by a number of monitors. The number of agents, for example, can include a number of network switches.

A sketch-set can be sent from a monitor to an aggregator. A sketch-set can include a network identifier (ID) of the start flow, a network ID of the end flow, a minimum size of a flow in the sketch-set, and a maximum size of a flow in the sketch-set. For example, a network ID can include a destination ID address of a flow in the network. A network ID, for instance, can include a 5-dimensional ID (e.g., source IP, destination IP, source port, destination port, protocol) and/or a 1-dimensional ID. The network ID of the start flow can include the beginning network ID of all flows that belong to a sketch-set. The network ID of the end flow can include the ending network ID of all flows that belong to a sketch-set. A minimum size of a flow in the sketch-set, for example, can include a smallest size (e.g., packet size) of any flow that belongs to the sketch-set. A maximum size of a flow in the sketch-set, for example, can include a largest size of any flow that belongs to the sketch-set. Thereby, a sketch-set can consume less memory than the individual representing the number of flows belonging to the sketch-set.

In some examples of the present disclosure, a sketch-set can include an arbitrary collection of flows based on a router path. For instance, a sketch-set can include a number of flows with common router paths. A router path, for instance, can include a trajectory of a flow (e.g., routers traversed by the packets of a flow). A trajectory of a flow, for instance, can be determined by identifying a network ID of a flow at a number of monitors. For instance, if a network ID is identified at two monitors, the trajectory of the flow associated with the network ID can include the two monitors. Flows with common trajectories, for instance, can be combined into a sketch-set.

In various examples of the present disclosure, the number of sketch-sets combined can include a number of coarse sketch-sets. A coarse sketch-set, for example, can include a sketch-set with a lower granularity than a less coarse sketch-set (e.g., finer sketch-set). Granularity can include a sum of sizes in a sketch-set, a network ID of the start flow subtracted from a network ID of the end flow, a port range of the flows in the sketch-set, a traffic range an/or a router path range. A high granularity sketch-set, for instance, can include a sketch-set that has a more precise representation than a lower granularity sketch-set (e.g., coarse sketch-set). In some examples of the present disclosure, the granularity of the number of combined sketch-sets can be defined and/or set prior to combining the number of sketch-sets created (e.g., set operations).

Combining the number of sketch-sets created can include combining common sketch-sets (e.g., sketch-sets with common flows). Combining common sketch-sets can include searching for common sketch-sets and creating a disjoint collection of sketch-sets. A disjoint collection of sketch-sets, for instance, can be formed using two common sketch-sets. The two common sketch-sets can be intersected into sketch-sets with common flows and subtracted (e.g., break apart) into sketch-sets with overlapping flows and non-overlapping flows (e.g., disjoint sketch-sets).

For example, an aggregator can receive a number of sketch-sets from a number of monitors. The aggregator, for example, can be used to process data sent (e.g., all data) from a number of monitors to detect anomalies in a network. An anomaly can include a sketch-set and/or flow in a network with a characteristic (e.g., flow size, traffic volume, number of ports, and bandwidth use) that may indicate the sketch-set and/or flow may cause problems in the network (e.g., bandwidth consuming flow, worms, and/or attacks). An anomaly can include icebergs flows, attacks, faults, traffic behavior, and congestion. Some examples of an anomaly can include network bottlenecks (e.g., top destinations, sources, and links), suspicious port scanning activity, and denial-of service attacks (DDoS) (e.g., destinations with a threshold volume of connections and/or traffic). An iceberg flow, for example, can include a flow that represents a fraction of the total flows with a significant property. For instance, a significant property can include receiving more than 1% of total traffic, service level agreement (SLA) compliance, and detection of worms and/or attacks.

The aggregator can combine common sketch-sets received. For example, a first sketch-set from a first monitor can be combined with a second sketch-set from a second monitor if the first sketch-set and the second sketch-set have common flows. Common sketch-sets, for example, can include sketch-sets with a common range of flows (e.g., a range of flows in a first sketch-set overlaps with a range of flows in a second sketch-set) and/or common router paths (e.g., common trajectories). The common sketch-sets combined, for example, can be combined with a granularity requirement determined and/or set prior to combining the sketch-sets. For example, a common sketch-set combined with a granularity requirement can include combining common sketch-sets within a predetermined flow range.

At 104, the method 100 can include requesting, using the aggregator, a finer sketch-set for an identified sketch-set among the combined number of sketch-sets. For example, the aggregator can send a request to a monitor to create a finer sketch-set for the identified sketch-set. An identified sketch-set, for example, can include a sketch-set that is identified as uncertain. For instance, an uncertain sketch-set can include a sketch-set that may and/or may not be an anomaly. The request, for example, can be sent to a monitor. The monitor can include an identified monitor among the number of monitors, a subset of monitors among the number of monitors, and/or the number of monitors.

A finer sketch-set, for example, can include a sketch-set with a higher granularity than the identified sketch-set (e.g., coarse sketch-set). A finer sketch-set can include a number of finer sketch-sets in some examples of the present disclosure. For instance, a finer sketch-set can include a sketch-set with a finer flow range (e.g., finer packet range) than the identified sketch-set, a sketch-set with a finer port range than the identified sketch-set, and/or a sketch-set with a finer traffic range than the identified sketch-set.

The identified sketch-set, in accordance with various examples of the present disclosure, can include a sketch-set below a first threshold value and above a second threshold value. A first threshold value and a second threshold value, for instance, can include a flow size of a sketch-set, a number of ports of a sketch-set, and a traffic volume of a sketch-set. The first threshold value, for instance, can include a predetermined value to identify an anomaly. The second threshold value, for example, can include a predetermined value wherein a sketch-set can be eliminated (e.g., the sketch-set is identified as not being an anomaly).

As an example, for identifying a global iceberg anomaly, a sketch-set among the combined number of sketch-sets that is above a first threshold size (e.g., a sketch-set with a minimum size of a flow in the sketch-set above the first threshold size) can be automatically identified as an anomaly. For instance, a threshold size can include a flow size (e.g., 500 megabyte (Mb), 200 Mb, and 1000 Mb). A sketch-set with a minimum flow size of 600 Mb, for instance, can be automatically identified as an anomaly if the first threshold size is set to 500 Mb.

Using the example of identifying a global iceberg anomaly, if a sketch-set among the combined number of sketch-sets is below a second threshold size (e.g., a sketch-set with a maximum size of a sketch-set in the sketch-set below the second threshold size), the combined sketch-set can be eliminated. Eliminating a sketch-set can include identifying the sketch-set is not an anomaly. If a sketch-set is above the second threshold size and below the first threshold size, the sketch-set can include an identified sketch-set (e.g., uncertain sketch-set).

In some examples of the present disclosure, the first threshold value and the second threshold value can include an identical threshold value. The first threshold value and second threshold value, for example, can include an anomaly threshold value (e.g., 500 Mb). An anomaly threshold value can include a predetermined packet count, size, port number and/or traffic volume of a sketch-set that can be identified as an anomaly. For instance, the first threshold value can include the anomaly threshold value related to the minimum flow size of a flow in a sketch-set, minimum number of ports of a flow in the sketch-set, and/or minimum traffic volume of a flow in a sketch-set. The second threshold size can include the anomaly threshold value related to the maximum flow size of a flow in the sketch-set, maximum number of ports of a flow in the sketch-set, and maximum traffic volume of a flow of the sketch-set. A sketch-set with a minimum value that is above the anomaly threshold value (e.g., first threshold value) can be identified as an anomaly. A sketch-set with a maximum value below the anomaly threshold value (e.g., second threshold value) can be eliminated. A sketch-set with a minimum value that is below the anomaly threshold value (e.g., first threshold value) and a maximum value that is above the anomaly threshold value (e.g., second threshold value) can include an identified sketch-set.

In some examples of the present disclosure, an identified sketch-set can include a sketch-set with a threshold number of ports. For instance, a sketch-set with more than a threshold number of ports can be identified as uncertain. A threshold number of ports, for instance, can include a predetermined number of ports (e.g., twenty, a hundred, and one thousand). A sketch-set with a threshold number of ports and/or more than the threshold number of ports can be identified as uncertain, for example.

In various examples of the present disclosure, identifying a sketch-set with a threshold number of ports can include identifying a sketch-set below a first threshold value (e.g., minimum number of ports of a flow in the sketch-set is below the threshold number of ports) and above a second threshold value (e.g., maximum number of ports of a flow in the sketch-set is above the threshold number of ports).

An identified sketch-set, in various example of the present disclosure, can include a sketch-set outside a threshold traffic volume. For instance, a threshold traffic volume can include a predetermined traffic volume of each of the flows in the sketch-set. For example, each of a number of flows in a sketch-set, formed based on common router paths, can have similar traffic volumes across the number of monitors along the common router path. An identified sketch-set, for instance, can include a sketch-set with a traffic volume of a flow in the number of flows that is above and/or below the traffic volume of the remaining flows in the sketch-set.

In some examples of the present disclosure, identifying a sketch-set outside a threshold traffic volume can include identifying a sketch-set below a first threshold value (e.g., minimum traffic volume of a flow in the sketch-set is below the threshold traffic volume) and above a second threshold value (e.g., maximum traffic volume of a flow in the sketch-set is above the threshold traffic volume). For instance, a threshold traffic volume can include a variance and/or standard deviation of traffic volume of flows in the sketch-set.

At 106, a finer sketch-set can be created for the identified sketch-set to detect an anomaly in the network. In some examples of the present disclosure, a monitor and/or a number of monitors can create the number of finer sketch-sets in response to a request for finer sketch-sets from an aggregator.

In various examples of the present disclosure, the finer sketch-set created can be sent to the aggregator to detect an anomaly. For example, a finer sketch-set (e.g., a first finer sketch-set) can be identified as an anomaly in response to the finer sketch-set being above a first threshold value (e.g. flow size, number of ports, and traffic volume). A finer sketch-set (e.g., a second finer sketch-set) can be eliminated in response to the finer sketch-set being below a second threshold value. A finer sketch-set (e.g., a third finer sketch-set) can be identified as an uncertain finer sketch-set in response to the finer sketch-set being below a first threshold value and above a second threshold value.

In some examples of the present disclosure, the method 100 can include requesting, using the aggregator a revised action for the identified sketch-set among the combined number of sketch-sets and performing the revised action for the identified sketch-set to detect a revised anomaly in the network using a monitor. For instance, a revised action can include creating a more fine sketch-set for an identified sketch-set among the finer sketch-set, creating a revised network ID for the identified sketch-set, and collecting traffic rates for the identified sketch-set.

The revised action, for instance, can be in response to detecting an uncertain sketch-set in the finer sketch-set and/or in response to a further query from an IT personnel. An IT personnel, for instance, can include a user associated with a network and/or responsible for monitoring the network. A revised anomaly can include a query for the anomaly and/or a revised anomaly query. A request for a revised action in response to detecting an uncertain sketch-set can occur automatically, for example.

For instance, an IT personnel, after identifying an iceberg anomaly, may query for a revised anomaly (e.g., new anomaly). A revised anomaly can include a routing anomaly, a trajectory anomaly, and/or a port anomaly, among others. A query for a routing anomaly and/or trajectory anomaly may include requesting traffic rate data for an identified sketch-set by an aggregator and performing collecting traffic rate data for the identified sketch-set by a monitor. A query for a port anomaly may include requesting for a revised network ID for the identified sketch-set by an aggregator and performing the creation of the revised network ID by a monitor. Thereby, the method 100 can include a multi-criteria and/or multi-anomaly query. The revised action can be requested to an identified monitor among the number of monitors, a subset of monitors among the number of monitors, and/or the number of monitors using the aggregator.

Figure 2:
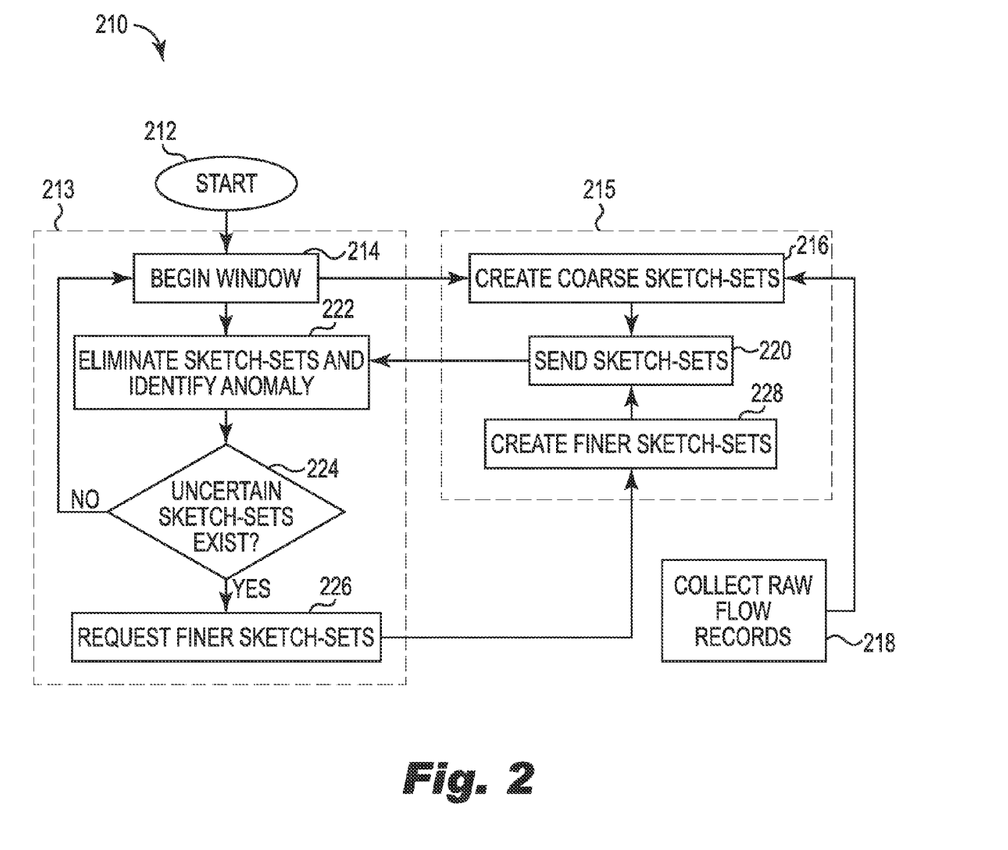
FIG. 2 is a flow chart illustrating an example process for detecting an anomaly in a network according to the present disclosure.

FIG. 2 is a flow chart illustrating an example process 210 for detecting an anomaly in a network according to the present disclosure. The following illustrates an example of the process 210 for detecting a global iceberg anomaly, however, the present disclosure is not limited to detecting iceberg anomalies (e.g., detect router anomalies, trajectory anomalies, and port anomalies, among many other anomalies).

At 212, the process 210 can begin. For example, the process 210 can begin in response to an IT personnel indicating to start 212 the process 210 (e.g., start an application). At 214, a begin window can appear. A begin window, can include a graphical user interface, for example.

For instance, an IT personnel can use a device (not shown) to communicate with an aggregator 213 over a network with a graphical user interface and/or the graphical user interface can be connected to the aggregator 213. That is, the device can be in communication with the aggregator 213 using a network connection. Examples of such a network connection can include a local area network (LAN), wide area network (WAN), personal area network (PAN), and the Internet, among others.

In response to a user selecting to begin, at 216, a number of sketch-sets (e.g., number of coarse sketch-sets) can be created using data (e.g., flow data). For example, the number of sketch-sets can be created by a monitor 215 and/or a number of monitors. The data can be collected from flow records from a number of agents at 218. The number of agents, for example, can include a number of switches in a network. At 220, the number of coarse sketch-sets can be sent from a monitor 215 to an aggregator 213.

At 222, the aggregator 213 can combine the number of sketch-sets into a number of common sketch-sets to eliminate sketch-sets and identify anomalies. For instance, the aggregator 213 can identify a first sketch-set among the number of common sketch-sets above a first threshold size (e.g., first threshold value) as an anomaly. The aggregator 213 can eliminate a second sketch-set among the number of common sketch-sets below a second threshold size (e.g., second threshold value). Thereby, the aggregator 213 can eliminate a number of sketch-sets below a second threshold size (e.g., maximum size of a flow in the sketch-set is below a global iceberg threshold).

At 224, a determination can be made by the aggregator as to whether uncertain sketch-sets exist. An uncertain sketch-set can include an identified sketch-set that is below the first threshold size and above the second threshold size. In response to determining no uncertain sketch-sets exist, at 214, the process can go to the start window 214 on the graphical user interface.

In response to determining a number of uncertain sketch-sets exist, at 226, the aggregator 213 can send a request for a finer sketch-set for an identified uncertain sketch-set (e.g., third sketch-set). Determining an uncertain sketch-set exists can include identifying a sketch-set that is below a first threshold size and above a second threshold size, for example.

The request, for example, can be sent to a monitor 215. The monitor 215 can include an identified monitor among the number of monitors, a subset of monitors among the number of monitors, and/or the number of monitors. For instance, the aggregator 213 can determine an identified monitor and/or subset of monitors to request a finer sketch-set from. The determination, for instance, of the identified and/or subset of monitors can be made by determining which monitors among the number of monitors are associated with data of the identified sketch-set. For instance, an identified sketch-set may have data sent to the aggregator 213 from two monitors among the number of monitors. The aggregator 213 can send a request for a finer sketch-set to the two monitors associated with the data of the identified sketch-set.

At 228, the monitor 215 and/or number of monitors can create a number of finer sketch-sets for the identified uncertain sketch-set. For example, the monitor 215 can create the number of finer sketch-sets 228 in response to receiving a request to create the finer sketch-sets from the aggregator. The monitor 215, for example, can create the finer sketch-set using data collected by the agent and/or number of agents 218.

At 220, the monitor 215 can send the number of finer sketch-sets created to the aggregator 213. In response to receiving the number of finer sketch-sets from the monitor 215, the aggregator 213 can combine the number of finer sketch-sets into a number of common finer sketch-sets to eliminate sketch-sets and identify anomalies, at 222. For instance, the aggregator 213 can identify a first finer sketch-set among the number of common sketch-sets above a first threshold size as an anomaly. The aggregator 213 can eliminate a second finer sketch-set among the number of common sketch-sets below a second threshold size.

In some examples of the present disclosure, the process 210 for detecting an anomaly in a network can be automatically repeated until no uncertain sketch-sets are detected and/or identified by the aggregator 213. Repeating the process 210, for instance, can eliminate detection of false positive anomalies and false negative anomalies. Thereby, the process 210 for detecting an anomaly in a network can include an iterative process involving a number of iterations (e.g., back and forth communication between the aggregator 213 and a number of monitors 215). The iterations, for instance, can include finer and finer sketch-sets so that the process 210 does not repeat indefinitely.

Figure 3:
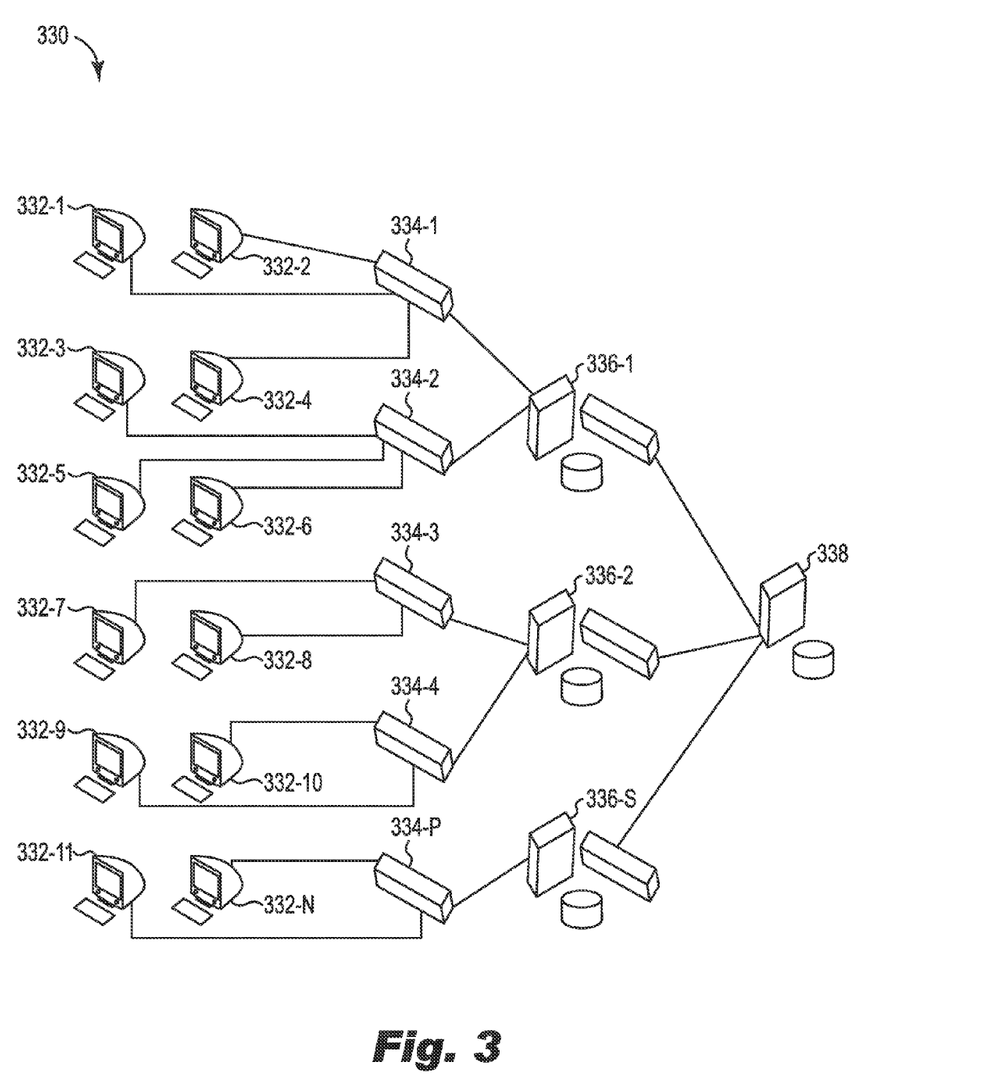
FIG. 3 is a flow chart illustrating an example of a system for detecting an anomaly in a network according to the present disclosure.

FIG. 3 is a flow chart illustrating an example of a system 330 for detecting an anomaly in a network according to the present disclosure. The system 330, in accordance with examples of the present disclosure, can be used to detect global iceberg anomalies, router anomalies, trajectory anomalies, and port anomalies, among many other anomalies.

The system 330 for detecting an anomaly in a network can include a number of devices 332-1, . . . , 332-N (generally referred to as 332), a number of agents 334-1, . . . , 334-P (generally referred to as 334), a number of monitors 336-1, 336-2 . . . 336-S (generally referred to as 336), and an aggregator 338.

The number of agents 334 can be configured to collect flow data from the number of devices 332. For example, a device 332-1 can send a sequence of packets, to be sent to a destination in the network (e.g., network ID). The sequence of packets can be processed and/or routed to the destination network ID by an agent 334-1. The number of devices 332 can send sequences of packets to the number of agents 334 via a network connection (e.g., local area networks and wide area networks) and/or a direct connection (e.g., directly connected via Ethernet cable). The number of agents 334 can collect the flow data from the number of devices through observing the sequence of packets sent from the number of devices 332, for example.

The number of agents 334 can send the flow data collected to a number of monitors 336. The number of agents 334 can send the flow data to the number of monitors 336 via a network connection (e.g., local area networks and wide area networks) and/or a direct connection (e.g., directly connected via Ethernet cable). As described herein, the number of monitors 336 can utilize software, hardware, firmware, and/or logic to generate a number of load scenarios based on a load behavior. The number of monitors 336 can be any combination of hardware and/or program instructions (e.g., CRI) configured to create a number of sketch-sets using the flow data collected by the number of agents 334 and send the number of sketch-sets to the aggregator 338. The hardware, for example, can include one or more processing resources, computer readable medium (CRM), etc.

The number of monitors 336 can send the number of sketch-sets to an aggregator 338. The number of monitors 336 can send the number of sketch-sets to the aggregator 338 via a network connection (e.g., local area networks and wide area networks) and/or a direct connection (e.g., directly connected via Ethernet cable). As described herein, the aggregator 338 can utilize software, hardware, firmware, and/or logic to generate a number of load scenarios based on a load behavior.

The aggregator 338 can be any combination of hardware and/or program instructions (e.g., CRI) configured to combine the number of sketch-sets received from the number of monitors 336 into a number of common sketch-sets, identify sketch-sets among the number of common sketch-sets above a first threshold value as an anomaly, eliminate sketch-sets among the number of common sketch-sets below a second threshold value, and send a request, to the number of monitors 336, to create a number of finer sketch-sets from a sketch-set among the number of common sketch-sets below the first threshold value and above the second threshold value.

In some examples of the present disclosure, the number of monitors 336 can be configured to receive a request to create finer sketch-sets for a sketch-set (e.g., identified sketch-set) from the aggregator 338, create a number of finer sketch-sets for the sketch-set using data collected by the number of agents 334, and send the number of finer sketch-sets to the aggregator 338.

In various examples of the present disclosure, the aggregator 338 can be configured to receive the number of finer sketch-sets created by the number of monitors 336, combine the number of finer sketch-sets into a number of common finer sketch-sets, identify a common finer sketch-set among the number of common finer sketch-sets above a first threshold value as an anomaly, and eliminate a common finer sketch-set among the number of common finer sketch-sets below a second threshold value.

In accordance with some examples of the present disclosure, detecting an anomaly in a network using the system 330 can include an iterative process. For instance, the aggregator 338 can automatically communicate a number of iterations to the number of monitors 336 until no sketch-sets below the first threshold value and above the second threshold value are identified. A communication can include a request to create a number of finer sketch-sets.

For instance, the aggregator 338 can identify a finer sketch-set among the number of finer sketch-sets created that is below a first threshold value and above a second threshold value as an uncertain sketch-set. The aggregator 338 can send a request to the number of monitors 336 to create a number of even finer sketch-sets for the identified finer sketch-set. An even finer sketch-set can include a sketch-set with a higher granularity then the identified finer sketch-set, for instance. The number of monitors 336 can create the even finer sketch-sets and send the even finer sketch-sets to the aggregator 338. The iterative process, for instance, can be automatically repeated until no sketch-sets are identified as uncertain by the aggregator 338.

The communication paths between the number of devices 332, the number of agents 334, the number of monitors 336, and the aggregator 338 can include network connections. Examples of such a network connection can include a local area network (LAN), wide area network (WAN), personal area network (PAN), and the Internet, among others.

Figure 4:
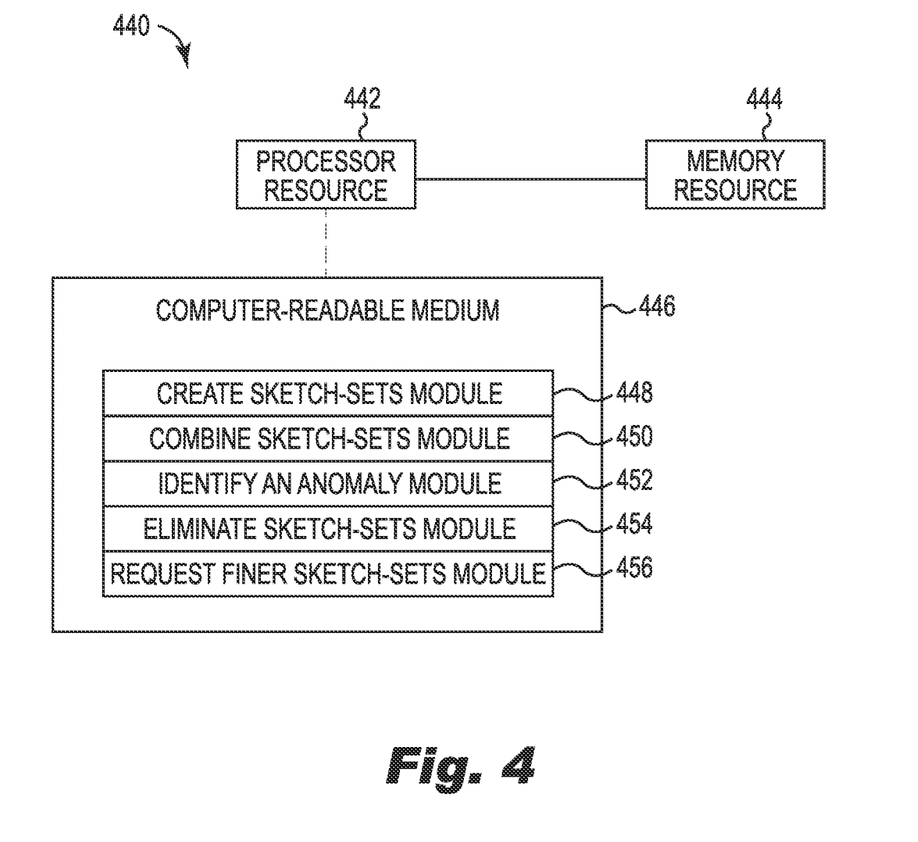
FIG. 4 is a block diagram illustrating a processor resource, a memory resource, and a computer-readable medium according to the present disclosure.

FIG. 4 is a block diagram 440 illustrating a processor resource 442, a memory resource 444, and a computer-readable medium 446 according to the present disclosure. The processing resource 442 and the memory resource 444 can be local to a computing device, such as on a router, switch, server, or other network device, etc. The computer-readable medium (CRM) 446 (e.g., a tangible, non-transitory medium) and/or the memory resource 444 can store a set of instructions executable by the processor resource 442. The CRM 446 can be local to a computing device or remote therefrom. For those examples in which the CRM 446 is remote from the computing device, the instructions can be loaded into the memory resource 444 of the computing device.

The processor resource 442, the memory resource 444, and computer-readable medium 446, in accordance with examples of the present disclosure, can be used to detect router anomalies, trajectory anomalies, and port anomalies, among many other anomalies.

As used herein, a processor resource 442 can include one or a plurality of processors such as in a parallel processing system. A memory resource 444 can include memory addressable by the processor resource 442 for execution of computer readable instructions, e.g., program instructions. The memory resource 444 can include volatile and/or non-volatile memory such as random access memory (RAM), static random access memory (SRAM), electronically erasable programmable read-only memory (EEPROM), magnetic memory such as a hard disk, floppy disk, and/or tape memory, a solid state drive (SSD), flash memory, phase change memory, etc. The CRM 446 can also be stored in remote memory managed by a server and represent an installation package that can be downloaded, installed, and executed.

As shown in the example of FIG. 4, the CRM 446 can include a number of modules 448, 450, 452, 454, and 456. The number of modules can include a create sketch-sets module 448, a combine sketch-sets module 450, an identify an anomaly module 452, a eliminate sketch-sets module 454, and a request finer sketch-sets module 456. The number of modules 448, 450, 452, 454, and 456 can include program instructions to perform particular acts, task, and/or functions as described herein when executed by the processor resource 442.

A create sketch-sets module 448 can include a number of instructions (e.g., a number of CRI) that can be executed by the processor resource 442 to perform or achieve the particular act or carry out the act of creating a number of sketch-sets using flow data.

A combine sketch-sets module 450 can include a number of instructions that can be executed by the processor resource 442. For example, the combine sketch-sets module 450 can combine the number of sketch-sets into a number of common sketch-sets.

An identify an anomaly module 452 can include a number of instructions that can be executed by the processor resource 442. For example, the identify an anomaly module 452 can identify a first sketch-set among the number of common sketch-sets above a first threshold value as an anomaly.

A eliminate sketch-sets module 454 can include a number of instructions that can be executed by the processor resource 442. For example, the eliminate sketch-sets module 454 can eliminate a second sketch-set among the number of common sketch-sets below a second threshold value.

A request finer sketch-sets module 456 can include a number of instructions that can be executed by the processor resource 442. For example, the request finer sketch-sets module 456 can request a finer sketch-set for a third sketch-set among the number of sketch-sets below the first threshold value and above the second threshold value to determine if the third sketch-set is an anomaly. A third sketch-set, for example, can include an identified sketch-set and an uncertain sketch-set.

The methods, techniques, systems, and apparatuses described herein may be implemented in digital electronic circuitry or computer hardware, for example, by executing instructions stored in computer-readable storage media. Apparatuses implementing these techniques may include appropriate input and output devices, a computer processor, and/or a tangible computer-readable storage medium storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

What is claimed:

1. A method for detecting an anomaly in a network comprising:
    combining a number of data-created sketch-sets using an aggregator, wherein the aggregator includes a processing resource;
    requesting, using the aggregator, a finer sketch-set for an identified sketch-set among the combined number of sketch-sets;
    creating the finer sketch-set for the identified sketch-set to detect the anomaly in the network using a monitor; and
    requesting, using the aggregator, a revised action for the identified sketch-set among the combined number of sketch-sets to detect a revised anomaly.

2. The method of claim 1, wherein the finer sketch-set for the identified sketch-set includes a sketch-set with a finer flow range than the identified sketch-set.

3. The method of claim 1, wherein the finer sketch-set for the identified sketch-set includes a sketch-set with a finer traffic range than the identified sketch-set.

4. The method of claim 1, wherein the finer sketch-set for the identified sketch-set includes a sketch-set with a finer traffic range than the identified sketch-set.

5. The method of claim 1, wherein the identified sketch-set further includes a sketch-set below a first threshold size and above a second threshold size.

6. The method of claim 1, wherein the identified sketch-set further includes a sketch-set with a threshold number of ports.

7. The method of claim 1, wherein the identified sketch-set further includes a sketch-set outside a threshold traffic volume.

8. The method of claim I, further including:
    performing the revised action for the identified sketch-set to detect the revised anomaly in the network using a monitor.

9. A non-transitory computer readable medium storing a set of instructions executable by a processor to cause a computer to:
    create a number of sketch-sets using flow data;
    combine the number of sketch-sets into a number of common sketch-sets;
    identify a first sketch-set among the number of common sketch-sets above a first threshold value as an anomaly;
    eliminate a second sketch-set among the number of common sketch-sets below a second threshold value; and
    request a finer sketch-set for a third sketch-set among the number of common sketch-sets below the first threshold value and above the second threshold value to determine if the third sketch-set is the anomaly.

10. The non-transitory computer readable medium of claim 9, wherein the first threshold value and the second threshold value further include at least one of a traffic volume of a sketch-set, a number of ports of a sketch-set, and a flow size of a sketch-set.

11. The non-transitory computer readable medium of claim 9, wherein the request includes a request to at least one of an identified monitor among a number of monitors, a subset of monitors among a number of monitors, and a number of monitors.

12. A system for detecting an anomaly in a network, the system comprising:
    a number of agents configured to collect flow data from a number of devices;
    a number of monitors configured to create a number of sketch-sets using the collected flow data; and
    an aggregator configured to:
        combine the number of sketch-sets received from the number of monitors into a number of common sketch-sets;
        identify a first sketch-set among the number of common sketch-sets above a first threshold value as the anomaly;
        eliminate a second sketch-set among the number of common sketch- sets below a second threshold value; and
        send a request, to the number of monitors, to create a number of finer sketch-sets for a third sketch-set among the number of common sketch-sets below the first threshold value and above the second threshold value.

13. The system of claim 12, wherein the number of monitors are further configured to:
    create the number of finer sketch-sets for the third sketch-set using data collected by the number of agents in response to receiving the request from the aggregator; and
    send the number of finer sketch-sets to the aggregator.

14. The system of claim 12, wherein the aggregator is further configured to:
    combine the number of finer sketch-sets received from the number of monitors into a number of common finer sketch-sets;

identify a first common finer sketch-set among the number of common finer sketch-sets above the first threshold value as the anomaly; and eliminate a second common finer sketch- set among the number of common finer sketch-sets below a second threshold value.

15. The system of claim 12, wherein the aggregator is further configured to automatically communicate a number of iterations to the number of monitors until no sketch-sets below the first threshold value and above the second threshold value are identified.

* * * * *

UNITED STATES PATENT AND TRADEMARK OFFICE
CERTIFICATE OF CORRECTION

PATENT NO.        : 8,677,485 B2                                  Page 1 of 1
APPLICATION NO.   : 13/548638
DATED             : March 18, 2014
INVENTOR(S)       : Puneet Sharma et al.

It is certified that error appears in the above-identified patent and that said Letters Patent is hereby corrected as shown below:

In the Claims

In column 11, line 61, in Claim 3, delete "traffic" and insert -- port --, therefor.

In column 12, line 6, in Claim 8, delete "I," and insert -- 1, --, therefor.

Signed and Sealed this
Twenty-fourth Day of June, 2014

Michelle K. Lee
*Deputy Director of the United States Patent and Trademark Office*